United States Patent
Demin

(10) Patent No.: US 8,409,763 B2
(45) Date of Patent: Apr. 2, 2013

(54) MODIFIED PLANAR CELL (MPC) AND STACK BASED ON MPC

(75) Inventor: Anatoly Demin, Ekaterinburg (RU)

(73) Assignee: Solid Cell, Inc., Rochester, NY (US)

( * ) Notice: Subject to any disclaimer, the term of this patent is extended or adjusted under 35 U.S.C. 154(b) by 1315 days.

(21) Appl. No.: 11/889,062

(22) Filed: Aug. 8, 2007

(65) Prior Publication Data

US 2009/0042076 A1   Feb. 12, 2009

(51) Int. Cl.
*H01M 8/12* (2006.01)
(52) U.S. Cl. .................. 429/465; 429/479; 429/513
(58) Field of Classification Search .............. 429/30–38, 429/465, 479, 482, 495, 513
See application file for complete search history.

(56) References Cited

U.S. PATENT DOCUMENTS

| | | | |
|---|---|---|---|
| 3,994,748 A * | 11/1976 | Kunz et al. ............... | 429/458 |
| 4,874,678 A * | 10/1989 | Reichner ............... | 429/479 X |
| 4,950,562 A | 8/1990 | Yoshida et al. | |
| 5,227,256 A | 7/1993 | Marianowski et al. | |
| 5,445,903 A * | 8/1995 | Cable et al. ............... | 429/465 |
| 5,460,897 A * | 10/1995 | Gibson et al. ............... | 429/461 |
| 5,856,035 A | 1/1999 | Khandkar | |
| 6,649,296 B1 * | 11/2003 | Minh ............... | 429/495 X |
| 6,824,910 B2 | 11/2004 | Chung et al. | |
| 6,835,488 B2 * | 12/2004 | Sasahara et al. ............... | 429/482 |
| 2004/0151975 A1 * | 8/2004 | Allen ............... | 429/38 |
| 2005/0238943 A1 * | 10/2005 | Akiyama et al. ............... | 429/38 |
| 2006/0204808 A1 * | 9/2006 | Takada et al. ............... | 429/26 |

FOREIGN PATENT DOCUMENTS

DE   25 14 034   9/1976

* cited by examiner

*Primary Examiner* — Stephen J. Kalafut

(74) *Attorney, Agent, or Firm* — R. J. Lasker, Esq.

(57) ABSTRACT

A single cell for a solid oxide fuel cell having wave-like architecture and a stack composed of such single cells is described. The cell design provides high durability. The stack design provides uniform distribution of reagents along the surface of the electrodes and between the individual cells. In addition the stack design is non material intensive.

8 Claims, 2 Drawing Sheets

MODIFIED PLANAR CELL (MPC) AND STACK BASED ON MPC

FIELD OF THE INVENTION

The invention relates to solid oxide fuel cells (SOFCs), particularly to a single cell design and to a stack composed of these cells, achieving improved specific stack characteristics and increased reliability.

BACKGROUND INFORMATION

A fuel cell utilizes the chemical energy of a fuel to produce directly electrical energy. This electrochemical conversion of fuel has a higher electrical efficiency than conventional energy generation, by eliminating mechanical losses. In addition to economic benefits, direct electrochemical conversion results in significant environmental advantages, by reducing emissions of greenhouse gas and eliminating emissions of toxic pollutants.

One of the several types of the fuel cells is a solid oxide fuel cell (SOFC). Solid oxide fuel cells are a promising technology for efficient and environmentally friendly power generation. The single cell of the SOFC possesses three basic parts: an electrolyte that conducts oxygen ions, an anode that produces electrons, and a cathode that consumes electrons. The most common fuel in an SOFC is synthesis gas which is produced from any fossil or prepared fuel and which consists mainly of hydrogen and carbon monoxide. Using synthesis gas as the fuel fed to the anode and oxygen gas from ambient air as the oxidant fed to the cathode, the following reactions occur: at the anode: $2H_2 + 2O^{2-} = 2H_2O + 4e^-$ and $2CO + 2O^{2-} = 2CO_2 + 4e^-$; at the cathode: $O_2 + 4e^- = 2O^{2-}$; for the cell as a whole: $2H_2 + O_2 = 2H_2O + heat$ and $2CO + O_2 = 2CO_2 + heat$.

A conventional SOFC utilizes a yttria stabilized zirconia (YSZ) ceramic for an electrolyte. The anode is a Ni-YSZ-cermet. Lanthanum-strontium manganate (LSM) is used for the cathode material.

The voltage produced by a single cell is about one volt. To increase voltage, the cells may be combined electrically in series to create a stack. The following materials are utilized for stacking the cells: an interconnect to provide electrical connection of the cells and a seal to provide mechanical gas-tight connection of the cells. Various non-scaling alloys and lanthanum-strontium chromate are usually used for the interconnect.

SOFCs may be constructed in a variety of geometries. A planar cell, such as a flat plate construction may have a self supporting anode, cathode or electrolyte sheet onto which the other components are mounted.

Planar fuel cell stacks can be constructed using a cross-flow configuration with external manifolds as exemplified for instance by U.S. Pat. No. 4,950,562 issued Aug. 21, 1990 and No. 5,856,035 issued Jan. 5, 1999. Gas channels are formed due to a set of grooves in the interconnect surface. This design provides uniform gas flow distribution within the cell's electrodes because the manifolds are very wide. However the design does not provide uniform gas flow distribution between the cells in the stack, because the cells are connected in parallel in respect of the manifolds. In this design, a considerable part of both the electrolyte and the interconnect surfaces are utilized for sealing and thereby decreasing the efficiency of material utilization.

Planar fuel cell stacks may also be constructed using a co-flow or counter-flow configuration with internal manifolds as exemplified for instance by U.S. Pat. No. 5,227,256 issued Jul. 13, 1993 and No. 6,824,910 issued Nov. 30, 2004. In this design, gas channels are formed by a set of grooves in the interconnect surface. However gas flows are not quite uniform within the cell's electrodes and especially between the cells in the stack because the cells are connected in parallel in respect of the manifolds which are very narrow. As in the abovementioned design, a considerable part of the surface both of the electrolyte and especially of the interconnect are utilized for sealing and therefore not utilized for power production, thereby decreasing the efficiency of material utilization.

In the abovementioned designs, both the cell and interconnect are flat. A planar design where the cell is not flat is exemplified by the German Pat. No. 25 14 034 issued Aug. 17, 1978. The support structure of the cell is a wave-like electrolyte and the interconnect is flat. The gas channels are formed by the wave-like cell surface in contact with the flat interconnect. In this design, the interconnect area is less than the cell working area, the interconnect has no grooves and therefore is thin, thus decreasing the stack material intensity. However, the stack structure is not durable because the electrolyte membrane is under mechanical stress from bending. The main problem with this design is providing gas tight separation of fuel and oxidant flows at the cell inlet.

SUMMARY OF THE INVENTION

The present invention is a novel architecture of an SOFC single cell. The invention utilizes the basic principle of the SOFC planar design, namely, alternation of the stack parts: anode, electrolyte, cathode, interconnect and introduces a novel modification of the cell architecture. The present design is therefore a modified planar solid oxide fuel cell (MP-SOFC).

The present invention improves the mechanical properties of the cell, substituting a bent structure in the conventional planar cell for a compressed structure in the MPSOFC achieved by a multi-wall electrolyte design.

The present invention improves specific characteristics of the cell and stack, because of more efficient utilization of the cell and interconnect surfaces.

The invention achieves uniform distribution of gas flows both between the cells and along the surface of the electrodes of the cell.

BRIEF DESCRIPTION OF THE DRAWINGS

The above objects, features and advantages of the invention are readily apparent from a consideration of the following description of the best mode of carrying out the invention when taken in conjunction with the following drawings representing a preferred embodiment of carrying out the invention, wherein.

DETAILED DESCRIPTION OF THE EXAMPLE EMBODIMENTS

Figure 1:
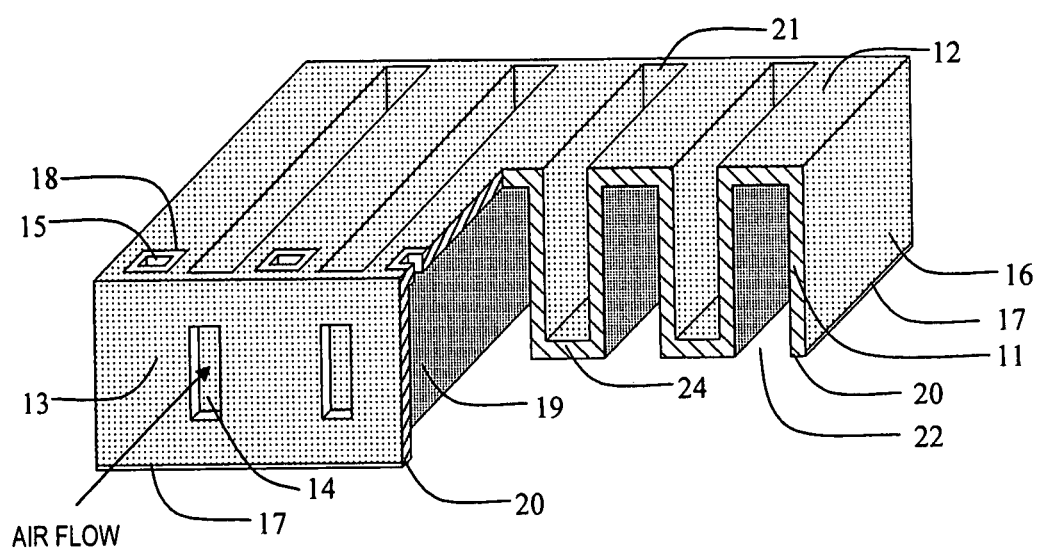
FIG. 1 illustrates a cross section of a single cell comprising an electrolyte, an anode and a cathode according to the present invention.

A modified planar cell (MPC) presented in FIG. 1 has as a support a solid oxide electrolyte membrane that represents a wave-lite plate 11 consisting of an odd-number of pi-shaped waves 12 of equal height, connected to one another by flat partitions 24 at the base of each wave and bound all together by two opposite lateral walls 13. Each of the lateral walls has a set of apertures 14 that open into the space between the pi-shaped waves. At the top of each pi shaped wave, there is an aperture 15 that opens inwards into the space within the pi-shaped wave. The upper surface of the electrolyte membrane is covered by a layer of porous cathode material 16 with the exception of strip 17 along the lower perimeter and areas 18 around the top apertures. The lower surface of the electrolyte membrane is covered by a layer of porous anode material 19 with the exception of a strip 20 on the underside of the electrolyte membrane along the lower perimeter.

The apertures 14 serve as the air inlets and outlets. The air channel 21 represents a space between the H-shaped waves bound by the interconnect attached to the top of the cell. The apertures 15 serve as the fuel inlets. The fuel channel 22 represents a space within the H-shaped wave bound by the interconnect attached to the bottom of the cell.

Figure 2:
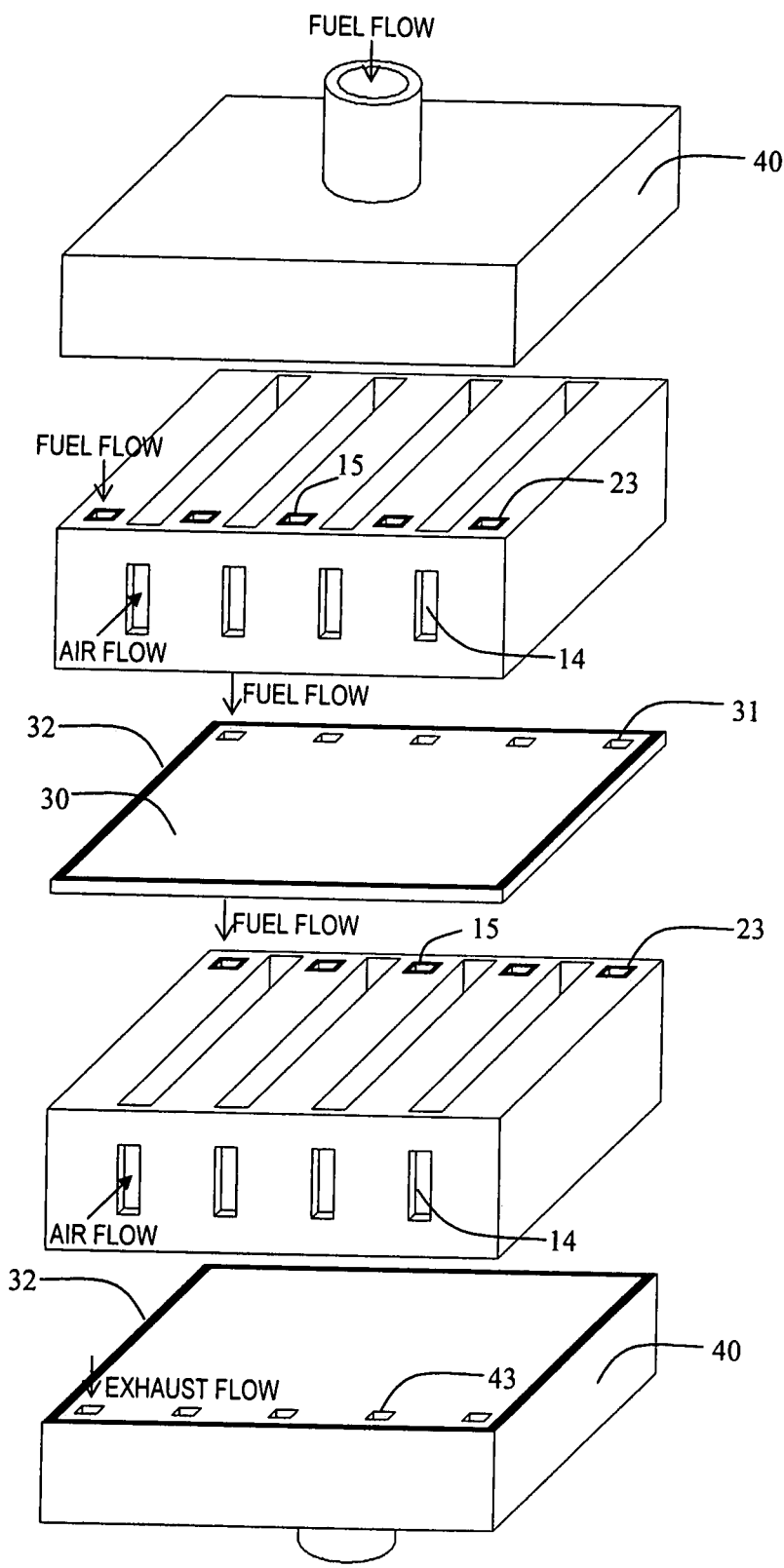
FIG. 2 illustrates a multi-cell stack incorporating two manifolds, two cells and an interconnect according to the present invention.

A multi-cell stack includes an intake and outlet manifold, several cells and interconnects between each pair of the cells. The stack illustrated in FIG. 2 comprises an inlet and outlet manifold 40, two cells 10 and one interconnect 30.

The interconnect is in the shape of a flat plate, having the same length and width as the cell. The plate is attached to the top of the cell and has a set of apertures 31 that are congruous to the set of apertures at the top of the H-shaped waves.

Sealing gaskets 23 are located between the upper edge of the cell and the lower edge of the upper interconnect plate and between the upper edge of the cell and the intake manifold in the areas around the top apertures 14. These gaskets create a gas-tight seal of the cell and the upper interconnect plate or the cell and the intake manifold. Sealing gaskets 32 are located between the lower edge of the cell and the upper edge of the lower interconnect plate and between the lower edge of the cell and outlet manifold along the periphery of the interconnect plate or the outlet manifold. This gasket creates a gas-tight seal of the cell and the lower interconnect plate or the cell and the outlet manifold. In order to distinguish the gaskets the latter 32 is designated "large gasket" and the former 23 is designated "small gasket".

The fuel flow enters the tube of the intake manifold and then through the set of the apertures 43 in the lower edge of the intake manifold and the set of the apertures 15 in the upper edge of the cell enters the anode channels of the cell. The flow moves along the channel and at the end of the channel crosses to the next cell through the set of the apertures 31 in the interconnect plate and the set of the apertures 15 in the upper edge of the cell. In order to provide continuous fuel flow passing from the upper cell to the adjacent lower cell along the fuel channel, the adjacent cells are rotated by 180° along their vertical axis relative to each other. The exhaust anode gas is discharged from the last cell of the stack through the set of apertures 43 in the upper edge of the outlet manifold.

The air flow enters the set of apertures 14 and passes through the same apertures in the opposite side of the cell.

Figure 3:
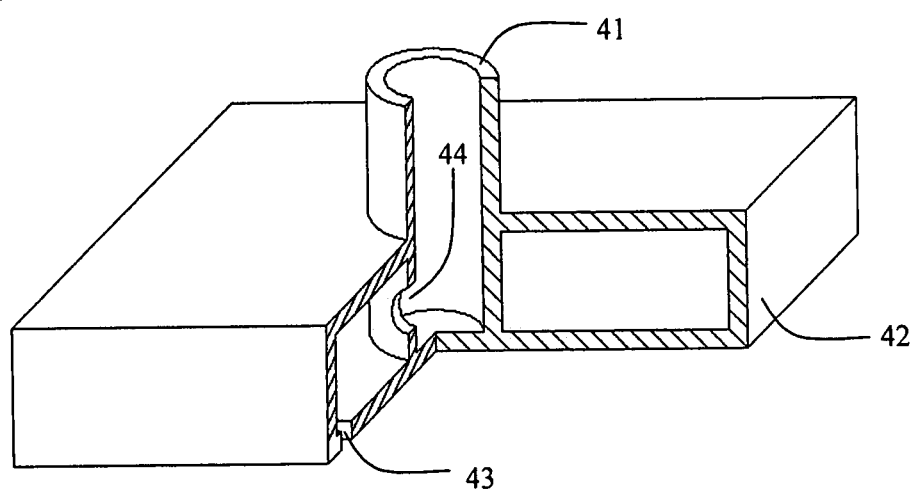
FIG. 3 illustrates a cross section of a manifold according to the present invention.

A cross section of a manifold is illustrated in FIG. 3. The manifold consists of a tube 41 and a rectangular box of the same length and width as the cell. The tube inserts through one of the walls of the box and is attached gas-tightly to the opposite wall of the box: the latter has a set of apertures 43 that are congruous to the set of apertures in the upper edge of the cell. The tube inside the box has a lateral aperture 44 for fuel input into the box or for exhaust anode gas output from the box. The material of the manifold is the same as for the interconnect.

Therefore, it is desired that the present invention not be limited to the embodiments specifically described, but that it include any and all such modifications and variations that would be obvious to those skilled in art of modified planar cells (MPC) and stacks based on MPC. It is my intention that the scope of the present invention should be determined by any and all such equivalents of the various terms and structure as recited in the following annexed claims.

What is claimed:

1. A modified planar cell comprising:
   a wave-like plate of solid oxide consisting of an odd number of pi-shaped waves of equal height, said plate being bound by two opposing lateral walls of equal height, said walls being perpendicular to said waves and having a set of apertures into spaces between the pi-shaped waves and spaces within said pi-shaped waves;
   said spaces within the pi-shaped waves represent anode channels and the spaces between the pi-shaped waves represent cathode channels of the fuel cell; and a set of apertures in the tops of the pi-shaped waves adjacent one of the lateral walls for the input of fuel into said anode channel.

2. The cell as claimed in claim 1, further comprising an upper surface of the cell covered by a layer of porous cathode material with the exception of a strip along a lower perimeter and areas around said top apertures; and a lower surface of the cell covered by a layer of porous anode material with the exception of a strip along the lower perimeter.

3. A modified planar cell comprising two of the modified planar cell structures as in claim 2 and further comprising interconnect plates extending between the modified planar cell structures; small sealing gaskets formed between said top apertures of each of said modified planar cell structures and said interconnect plates; large sealing gaskets formed between the lower surface of each of said modified planar cell structures and the interconnect plates; and gas intake and gas outlet manifolds connected to each of said modified planar cell structures for the ingress of fuel and exhaust, respectively from each of the modified fuel structures.

4. The modified planar cell as in claim 3 wherein said interconnect plates have the same length and width of the modified planar cell and include a set of apertures that are aligned with the apertures of the pi-shaped waves.

5. The modified planar cell as in claim 4 wherein each of the modified planar cells include an intake manifold; the small sealing gaskets are of rectangular shape and are formed around the apertures in the tops of the pi-shaped waves and provide a gas tight seal for each of the modified planar cells, the interconnect plates and the intake manifolds.

6. The modified planar cell as in claim 3 wherein, the large sealing gaskets have a rectangular shape and are formed along the lower perimeter of each of the modified planar cells and provide a gas tight seal of the modified planar cells between the lower interconnect plates and the gas outlet manifolds.

7. The modified planar cell as in claim 3 wherein the modified planar cells are stacked one on top of one another and the lower modified planar cell is rotated 180 degrees along its vertical axis relative to the upper modified planar cell.

8. The modified planar cell as in claim 3, wherein the gas intake and gas outlet manifolds are rectangular and of the same length and width of the modified planar cells; and further comprising a tube inserted through one of the walls of the rectangular gas intake and gas outlet manifolds and attached in a gas tight manner to the opposite wall of the box; the opposite wall having a set of apertures aligned with the apertures at the top of each of the pi-shaped waves of the modified planar cells; the tube includes a lateral aperture inside the rectangular-shaped gas intake and gas outlet manifolds for respect fuel input or exhaust anode gas output.

\* \* \* \* \*